United States Patent [19]

Kasakevich et al.

[11] Patent Number: 5,082,613
[45] Date of Patent: Jan. 21, 1992

[54] METHOD FOR IMPROVEMENT OF POLYBUTYLENE PIPE STRENGTH

[75] Inventors: Mark L. Kasakevich, Missouri City; Donald H. Krasner, Houston; Jerry W. Secrist, Katy; Roland O. Meuhlner, Houston, all of Tex.

[73] Assignee: Shell Oil Company, Houston, Tex.

[21] Appl. No.: 556,673

[22] Filed: Jul. 23, 1990

[51] Int. Cl.$^5$ .............................................. B29C 47/88
[52] U.S. Cl. .............................. 264/178 R; 264/209.4; 264/237; 425/71
[58] Field of Search ............ 264/237, 178 R, 560–566, 264/568, 150, 209.3, 209.4; 425/71, 378.1, 379.1, 380

[56] References Cited

U.S. PATENT DOCUMENTS

| | | | |
|---|---|---|---|
| 3,553,303 | 1/1971 | Zavasnik | 264/237 |
| 3,576,051 | 4/1971 | Click et al. | 264/564 |
| 3,686,388 | 8/1972 | Beckmann et al. | 264/237 |
| 3,804,567 | 4/1974 | Recknagel | 425/378.1 |
| 3,936,524 | 2/1976 | Toba et al. | 264/237 |
| 4,120,926 | 10/1978 | Titz | 264/237 |
| 4,314,958 | 2/1982 | Macleod et al. | 264/237 |
| 4,783,301 | 11/1988 | Hong | 264/312 |
| 4,812,274 | 3/1989 | Labaig et al. | 264/150 |

FOREIGN PATENT DOCUMENTS 1145911 3/1969 United Kingdom ............. 264/209.4

Primary Examiner—Jeffery Thurlow

[57] ABSTRACT

A process is disclosed for the formation of polybutylene pipes having improved mechanical properties, by reduction in the rate of cooling of the extrudate used to form the pipe sections. Preferably, the ratio of the cooling bath residence time in minutes divided by the cooling water temperature in degrees Fahrenheit is selected to be in the range of from about 0.004 to about 0.010.

3 Claims, 3 Drawing Sheets

METHOD FOR IMPROVEMENT OF POLYBUTYLENE PIPE STRENGTH

BACKGROUND

1. Field of the Invention

The method of the present invention relates to the use of extrusion cooling conditions which yield small diameter polybutylene pipe having significantly higher short term (quick burst) strength.

2. Description of the Prior Art

Other processes have been developed and described for the manufacture of polybutylene tubing having certain desired surface smoothness and/or mechanical properties.

U.S. Pat. No. 3,553,303 discusses a process wherein an externally cooled tubing extrudate is cut and immediately immersed in a cooling bath, the hot surface of the pipe's inner diameter being rapidly quenched to provide a smooth surface which is substantially free from rough, undesirable large crystals. These undesireable large crystals or "spherulites" will result from a slow cooling of the inner diameter of the pipe. It should be noted that the object of the '303 invention is the manufacture of thermoplastic tubing having a smooth internal surface, and not necessarily having improved burst pressures.

U.S. Pat. No. 3,686,388 overcomes the prior art cold-forming limitations of elastic memory and/or rupture, by cold-forming the plastic product into a final shape within thirty minutes after the semi-finished product has cooled from the melt, and thereafter storing the shaped product from about 0.5 to 12 hours while avoiding the effects of larger forces on the product. As noted in this '388 patent, cold-formed thermoplastic material exhibits the property of so called elastic memory, wherein the material shows a tendency to return from the shape from which the material was forced during the forming process into the original shape of the material, partially by elasticity, and partially by creep.

In Example 1 of this '388 patent, a solid rod of poly-1-butene having a diameter of 6 mm, a solution viscosity of 4.8, and a melt index of $I^5$ equal to 0.5 gms per 10 minutes, is continuously extruded in the form of a melt, formed into a straight rod by means of a gauge while still in a pasty condition and cooled with water to room temperature. The temperature of the rod is 22° C. One minute and ten seconds after extrusion, a cut to length piece of rod ½ meter long is coiled around a mandrel so that the individual turns are in contact with one another, forming a helically wound rod. After termination of the coiling process which lasts about 1½ minutes, the mandrel is removed from the now coiled rod. The helically wound rod is then stored for 8 hours without placing any strains thereupon. The shaped article so formed thereafter has sufficient stability for use as a helical spring adapted to apply a light tension load thereto.

It should be noted that this patent also does not teach a method of improving the burst pressure of polybutylene pipe.

In U.S. Pat. No. 3,822,333 a process of forming polyolefin forms having roughened surfaces is disclosed, wherein the melt is drawn through a solvent bath prior to solidification. This reference relates to the use of a shortened solvent bath residence time of 1 minute or less. The time necessary for the surface of the resin in a molten state to be cooled and solidified is very short, in the order of several tenths of a second or at most several seconds. Cooling of the entire shaped article is also usually completed in one minute or less when the article has a thickness of 1 mm or less; and in about ⅛ second when it has a thickness of about 0.03 mm.

U.S. Pat. No. 3,936,524 discloses a process wherein polyisobutylene oxide polymer moldings containing 70 wt % or more of isobutylene oxide, are prepared by heating the polymer to a temperature about 170° C. and then quickly cooling the same by contacting the polymer with a coolant to obtain crystalline resin having a diffraction peak at about $2\tau=12°$ in the X-ray diffraction pattern of the resin.

Great Britain Patent 819,396 discloses a process for providing hollow elongated shapes such as polyethylene tubing and pipe having superior stress resistance, wherein the pipe is extruded from a melt of the polyethylene polymer, quenched to a shaped stable form, and wherein thereafter the external surface of the shape is heated to a temperature and for a time sufficient to relax or "anneal" the polymer surface. The thermal treatment after quenching is of sufficient intensity to heat the exterior surface of a shape to a temperature above the melting point of the polyethylene.

And finally, U.S. Pat. No. 4,783,301 discloses a process wherein polybutylene-1 polymer is introduced into a form which defines the shape of the desired part and is then subjected to shear at a temperature from just above to just below the melting point of the polybutene-1 polymer, achieved by positioning the polymer blend between a shell and a mandrel and rotating the two relative to one another. The foregoing "shear" method substantially improves the mechanical properties of the polybutene-1 pipe with a claimed increase of 1500% or more.

A process needs to be developed that improves the burst pressure properties of polybutylene pipe, without the necessity of the complex shear apparatus of the '301 patent, or the post-extrusion annealing process of Great Britian Patent 819,316.

SUMMARY OF THE INVENTION

The method of the present invention allows the production of polybutylene thermoplastic tubing having improved mechanical properties wherein the molten polybutylene thermoplastic material is first extruded in the form of a continuous tube, and thereafter cooled slowly. The tubing is cooled by movement of the tube through a spray cooling tank for a particular bath residence time, while spraying the tube with water having a particular temperature. In a preferred embodiment of the invention, the ratio of the bath residence time in minutes divided by the water temperature in degrees Fahrenheit is in the range of from about 0.004 to about 0.010.

More specifically, the bath residence time may be selected from about 0.40 to about 0.80 minutes and the water temperature may be selected from about 40° to about 80° F. as long as the above ratio of bath residence time versus water temperature is maintained.

It is therefore an object of the present invention to produce polybutylene pipe having improved mechanical properties.

It is a feature of the present invention to maintain a certain ratio between the bath residence time and the water temperature of the bath, in order to produce the polybutylene pipe having the improved mechanical properties.

These and other features, objects and advantages in the present invention will become apparent from the following detailed description, wherein reference is made to the accompanying figures and table.

BRIEF DESCRIPTION OF THE DRAWING

Table 1 presents in tabular form a portion of the data used to generate FIGS. 2, 3, and 4.

DESCRIPTION OF THE PREFERRED EMBODIMENT

Figure 1:
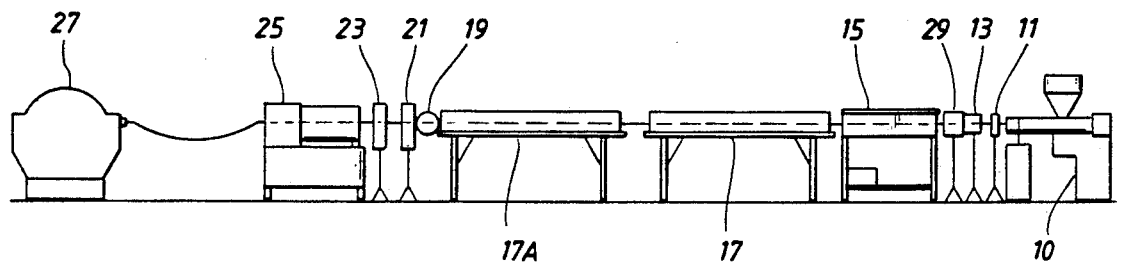
FIG. 1 shows a schematic representation of a tubing extrusion apparatus, with associated spray cooling tanks.

Referring now to FIG. 1 the apparatus used for the production of the extruded polybutylene pipe is disclosed. The extruder 10 used during the generation of the polybutylene pipe comprises a 3½" Egan Model No. FO-0415-01 water cooled extruder with a 24:1 L/D ratio, being powered by a 70 hp DC motor. The extruder screw is a 3½", 24:1 L/D ratio, two stage plastics processing screw with an Egan shaft. The screw has a 6" long mixing section located between the metering sections. A Foremost model DD-2 dehumidifying hopper dryer with a 200 lb. hopper capacity and a Foremost V-6 automatic vacuum loader was used. The automatic screen packer changer 11 comprised a 3½" Beringer Model No. SL-35 with a series SP model 4S-264-016-0 hydraulic assist unit. The melt pump 13 comprised an Entrex (MAAG) Model No. 45/45 melt pump with a 400 lb output capacity driven by a five HP AC motor. The vacuum tank 15 comprised a Littleford stainless steel vacuum tank with three separate vacuum compartments, and roller supports at 18" intervals, the tank being 10 ft. in length.

Two spray cooling tanks 17, 17a comprise a Littleford stainless steel spray cooling tank 17 Series 80, Model SE 5/20R bolted to a Littleford stainless steel spray cooling tank 17A Series 80, Model SE 5/15R, having roller supports at 18" intervals.

The air wipe system 19 comprised a Huestis pipe air wipe system Model No. AW-160. A pipe wall thickness measurement system 21 comprised a NDC Model No. 102 mass/thickness, gamma back scatter pipe wall thickness measurement system. The outer diameter monitoring system 23 comprises a Zumbach model ODAC No. 148XY optical dual plane diameter scanning unit (laser) with XY-19M-16B electronic unit and display with RS 232 output.

The pipe line puller/cutter system comprises a Versa Model No. 90-44 combination puller/cutter system with a 5 HP AC puller motor, having a Versa automatic programmable cutter control Model No. F-7. A Sakas Model No. 00L-90 quick dump collapsible coiler 27 was used.

Figure 5:
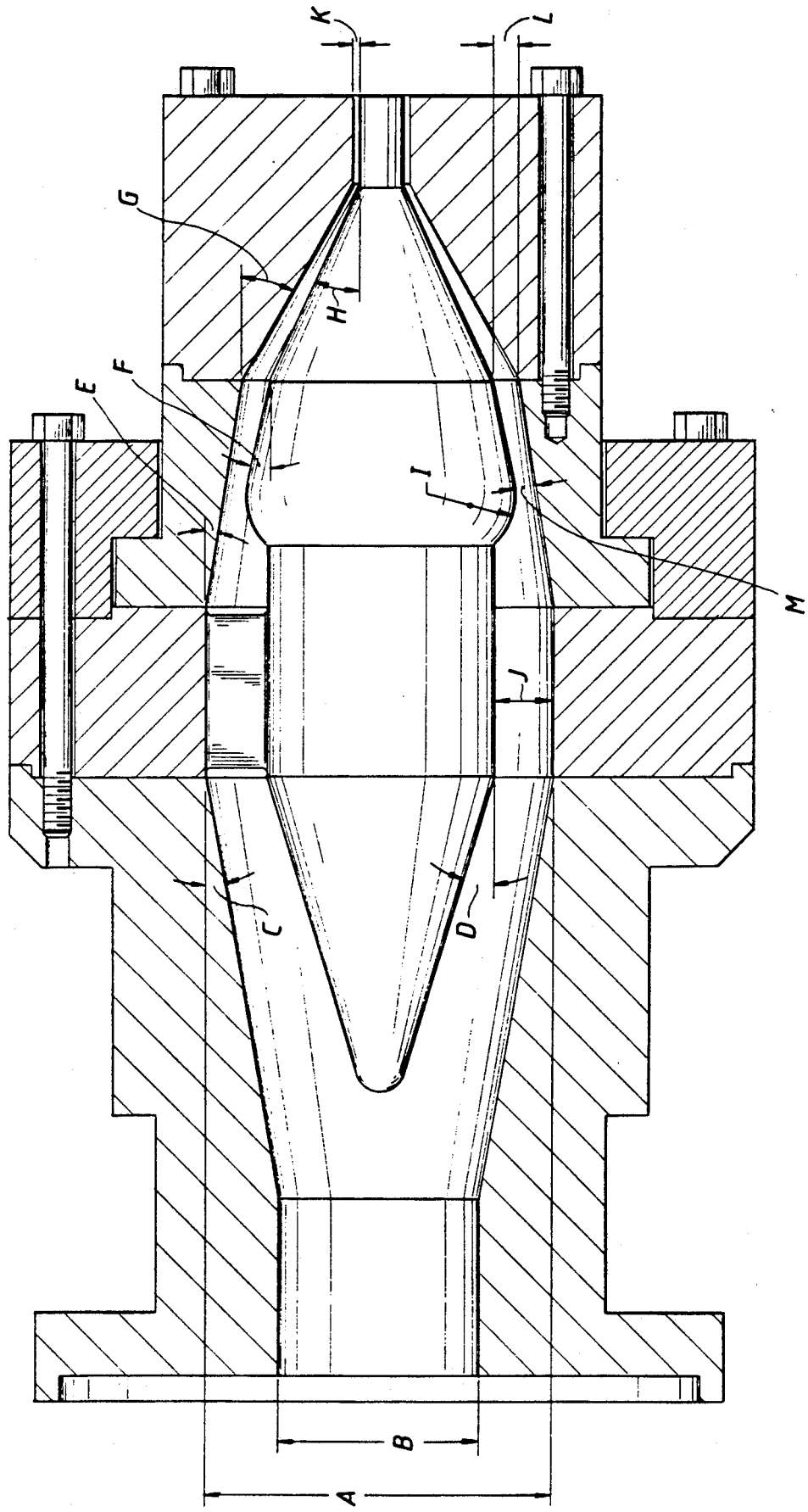
FIG. 5 shows a schematic representation of the die design used during the extrusion of the pipe of the subject invention.

The die 29 and crosshead design is as shown in FIG. 5.

The test apparatus also included a computer controlled data acquisition system supplied by Applied Automation Research, having programmable data storage and memory interfacing with a Mannesmann Tally Model No. MT-86 printer.

Figure 2:
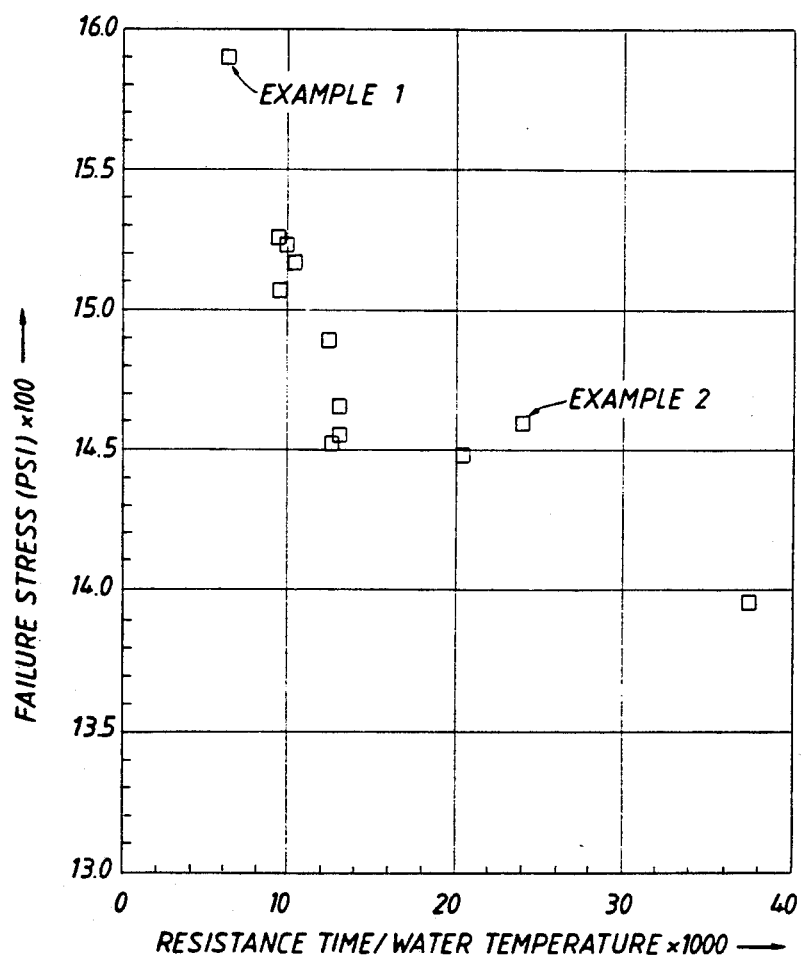
FIG. 2 shows a graphical representation of failure stress versus residence time/water temperature (×1000).
Figure 4:
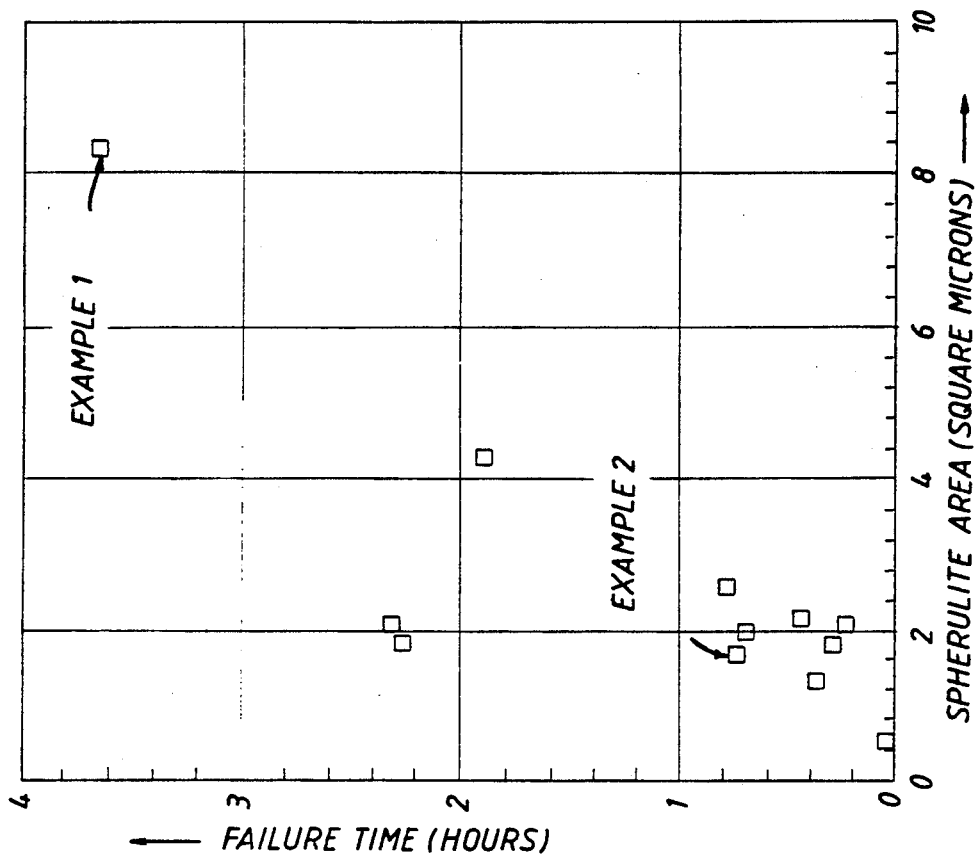
FIG. 4 shows a graphical representation of spherulite size versus failure time.
Figure 3:
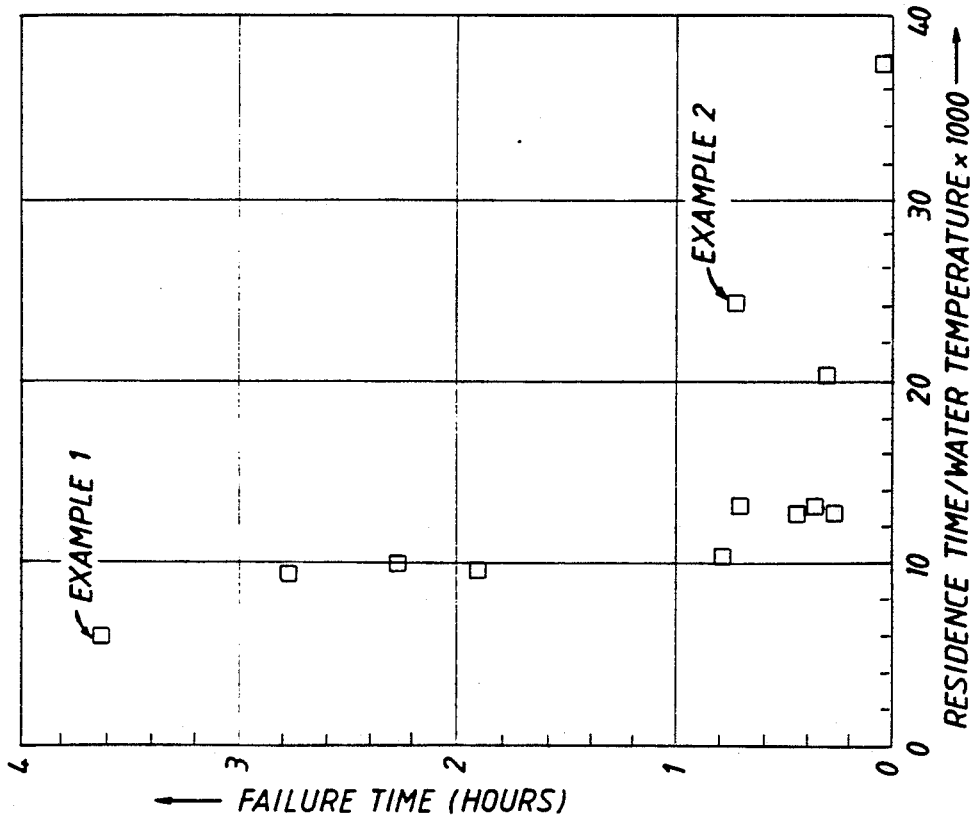
FIG. 3 shows a graphical representation of failure time versus residence time/water temperature (×1000).

The data collected during the operation of the equipment shown in FIG. 1 is presented in tabular form in Table 1, and represented graphically in FIGS. 2, 3, and 4.

Referring now to FIG. 2 it can be seen that as the residence time/water temperature ratio (×1000) is maintained at less than 10 that the failure stress increases significantly, as compared for example with the failure stress of the samples having a ratio greater than 11. In a similar manner referring now to FIG. 3, the failure time of the Example 1 sample can be seen to be significantly higher than the failure time of the Example 2 sample. It can be seen from the presented data that the preferred ratio of the bath residence time in minutes divided by the water temperature in degrees Fahrenheit should be selected to be in the range from about 0.004 to about 0.010 to yield the highest failure stress, as well as the longest failure time for the same polybutylene material.

Duraflex 4137 polybutylene material, manufactured by Shell Chemical Company of Houston, Tex., was used as the polybutylene test material. This particular polymer has a 94 to 96.5% isotactic composition, the remainder being atactic, with, however, a trace proportion of syndiotactic material, (1–2% maximum) not being uncommon. It should be well recognized that any other polybutylene material approved for plumbing and heating applications may also be used. The typical melting point for polybutylene is in the range of from about 255° F. to about 259° F., polybutylene typically having a coefficient of thermal expansion of $7.1 \times 10^{-5}$, a poisson's ratio of 0.46, and a coefficient of thermal conductivity of 1.50.

Without further elaboration the following illustrative Examples are presented. Example 1 will describe the fabrication and subsequent test conditions for the polybutylene pipe specimen data labeled on FIGS. 2, 3 and 4 as "Example 1", the Example 1 residence time/water temperature conditions being the preferred process conditions of the present invention. By way of comparison, "Example 2" data is also labeled on the attached FIGS. 2, 3 and 4.

EXAMPLE 1

In a preferred embodiment of the present invention, the test specimen was extruded at a rate of 55 ft/min through a water bath having a temperature of 77° F., the bath length being 26 ft, the bath residence time in minutes being 0.47 minutes. The resultant polybutylene pipe exhibited a quick burst pressure of 1590 psi, a DIN 1000 failure time of approximately 3.6 hours, (FIG. 3), and a spherulite area in square microns of approximately 830 square microns. The residence time/water temperature ratio (times 1000) for this specimen was approximately 6. The low residence time/water temperature ratio allowed the growth of large spherulites with significant resultant increase in burst strength, as compared to the other data.

EXAMPLE 2

Example 2 describes the common prior art practice of cooling the extruder pipe as quickly as possible, wherein the water temperature was maintained at 76° F. The extrusion rate through the spray cooling tanks was decreased to 25 ft/min, the pipe being drawn through a bath length of 46 ft with a resultant bath residence time of 1.84 minutes. The quick burst pressure decreased to 1459 psi, the residence time/water temperature ratio (times 1000) increased to approximately 24, and the spherulite area decreased to approximately 170 square microns, as compared to the approximately 830 square microns for the Example 1 specimen.

It can be readily seen in comparing the results of the Example 1 and Example 2 test conditions that the processing conditions of the present invention, set forth in Example 1, have been identified which result in the extrusion of small diameter polybutylene pipes of significantly higher short term (quick burst) strength. These conditions, wherein the extruded pipe is cooled as slowly as possible, present a marked departure from common industry practices and thereby serve as a discrete technological jump. The current industry practices are based on the belief that colder water and longer cooling times are best. The proposed approach prescribes to exactly the opposite. Hotter water and shorter cooling times are best for short term pipe performance.

Many other variations and modifications may be made in the apparatus and techniques hereto described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claim as our invention:

1. A method of producing polybutylene theroplastic tubing having improved mechanical properties, said method comprising the steps of:
    extruding molten polybutylene thermoplastic material in the form of a continuous tube; and
    slowly cooling said molten material by moving said tube through a spray cooling tank for a particular bath residence time, while spraying said tube with water having a particular temperature; the ratio of said bath residence time in minutes divided by said water temperature in degrees Fahrenheit being in the range from about 0.004 to about 0.010.

2. The method of claim 1 wherein said bath residence time is from about 0.40 to about 0.80 minutes.

3. The method of claim 1 wherein said water temperature is from about 40° to about 80° F.

* * * * *